United States Patent [19]
Astrom

[11] Patent Number: 5,951,878
[45] Date of Patent: Sep. 14, 1999

[54] METHOD AND APPARATUS FOR CLEANING FILTER MATERIAL IN A FILTER APPARATUS UTILIZING A SUCTION GENERATING NOZZLE

[75] Inventor: Gordon Astrom, New Marshfield, Ohio

[73] Assignee: Aqua-Aerobic Systems, Inc., Rockford, Ill.

[21] Appl. No.: 09/045,319

[22] Filed: Mar. 20, 1998

[51] Int. Cl.[6] ........................... B01D 37/00; B01D 33/21; B01D 33/50

[52] U.S. Cl. ......................... 210/791; 210/197; 210/331; 210/332; 210/333.01; 210/391; 210/406; 210/407; 210/416.1

[58] Field of Search ..................................... 210/780, 791, 210/197, 331, 332, 333.01, 391, 406, 407, 416.1

[56] References Cited

U.S. PATENT DOCUMENTS

| | | |
|---|---|---|
| 1,042,295 | 10/1912 | Trent . |
| 1,259,139 | 3/1918 | Salisbury . |
| 1,335,695 | 3/1920 | Oliver . |
| 1,512,977 | 10/1924 | Depue . |
| 1,560,796 | 11/1925 | Genter .................................... 210/798 |
| 1,649,581 | 11/1927 | Genter et al. . |
| 1,700,772 | 2/1929 | McCaskell . |
| 2,022,069 | 11/1935 | Whitmore ............................... 210/797 |
| 2,351,652 | 6/1944 | Anderson ............................... 210/798 |
| 3,559,809 | 2/1971 | Barnmore .............................. 210/411 |
| 4,038,187 | 7/1977 | Saffran .................................. 210/108 |
| 4,090,965 | 5/1978 | Fuchs ................................... 210/151 |
| 4,639,315 | 1/1987 | Fuchs et al. ......................... 210/333.1 |
| 4,971,694 | 11/1990 | Richter ............................... 210/333.01 |
| 5,059,323 | 10/1991 | Galletti .................................. 210/400 |
| 5,362,401 | 11/1994 | Whetsal ................................ 210/741 |
| 5,374,360 | 12/1994 | Weis .................................... 210/780 |
| 5,401,405 | 3/1995 | McDougald ........................... 210/273 |

OTHER PUBLICATIONS

"Aqua–Filter", Aqua–Aerobic Systems, Inc., Bulletin No. 100M, Jan., 1993.

"L Series Selection", Penberthy, Inc., Jet Pumps Product Literature, issued as early as Apr., 1987.

*Primary Examiner*—Robert J. Popovics
*Attorney, Agent, or Firm*—Michael Best & Friedrich LLP

[57] ABSTRACT

A filter cleaning apparatus includes a suction generating assembly having a suction generating nozzle, such as an eductor nozzle. The suction generating nozzle has a nozzle inlet, a nozzle outlet, and a suction port in fluid communication with the filter material. The suction generating assembly also includes a suction member positioned in fluid communication with the suction port and positioned adjacent the influent surface of the filter material. A pump is positioned upstream of the nozzle inlet and in fluid communication, on a suction side, with the filter tank or other liquid source. The pump may be operated to deliver operating fluid from the filter tank so as to pass the operating fluid through the suction generating nozzle in a direction from the nozzle inlet to the nozzle outlet. As a result, liquid in the filter tank is drawn through the filter material in a reverse direction and into the suction member. The liquid stream that results acts to remove filtered solids and biogrowth from the filter material. The liquid stream, filtered solids and biogrowth, are discharged along with the operating fluid through the nozzle outlet.

21 Claims, 3 Drawing Sheets

METHOD AND APPARATUS FOR CLEANING FILTER MATERIAL IN A FILTER APPARATUS UTILIZING A SUCTION GENERATING NOZZLE

FIELD OF THE INVENTION

The present invention relates generally to a filter apparatus for filtering out suspended solids from liquid effluent that is passed through filter material. More particularly, the present invention relates to a method and apparatus for cleaning the filter material.

BACKGROUND OF THE INVENTION

One type of filter apparatus for filtering suspended solids includes a tank having an inlet and an outlet, a filter frame positioned between the inlet and outlet, and filter material supported on the filter frame. During a filtering operation, liquid effluent is passed through the filter material such that the filter material filters out suspended solids from the effluent stream. The filtered solids are deposited on the filter material while the filtered liquid stream is discharged from the tank as effluent.

To remove the filtered solids from the filter material, it is known to provide the filter apparatus with a centrifugal pump that is connected to a suction head positioned adjacent a surface of the filter material. The centrifugal pump is operated to draw filtered liquid through the filter material in a backwash or reverse direction. The backwash flow that results acts to dislodge the filtered solids from the filter material.

In practice, however, filtered solids continue to accumulate within the filter material despite successive backwash operations. Some of the filtered solids become so deeply embedded in the filter material that the backwash flow is ineffective in dislodging these solids. Accordingly, the friction losses across the filter material begin to rise, which causes a corresponding reduction in the backwash flow rate generated by the pump. Further, as a result of the reduction in backwash flow rate, solids accumulate within the filter material at an increased rate. Thus, the effectiveness of the backwash operation diminishes with time and as solids continue to accumulate within the filter material. If the net positive suction head for the pump is allowed to continue to drop, the pump experiences cavitation and/or loses suction altogether. Either condition is undesirable because it causes permanent damage to equipment (e.g., the pump impeller and seals), requires operator attention, and interrupts the filter operation.

In a second cleaning step, a high-pressure liquid spray is directed from one or more spray nozzles to the surface of the filter material. The high pressure spray penetrates the surface, impacts the deeply embedded solids, and dislodges these solids from the filter material.

However, in order for the spray to be effective, the tank must be drained of sufficient liquid volume so that the spray nozzles are above the liquid level. This typically requires the filtering operation to be stopped for the duration of the spray operation. Therefore, to minimize filter downtime, the spray operation is initiated only when solids accumulation on the filter material is so great that the backwash flow is rendered ineffective, or alternatively, when it is convenient to stop the filtering operation.

SUMMARY OF THE INVENTION

The present invention relates to a filter apparatus for filtering suspended solids from liquid effluent. The filter apparatus includes a tank having an inlet for receiving liquid effluent and an outlet for filtered effluent, a frame positioned inside the tank, and filter material supported by the frame. The filter material has an inlet surface and an outlet surface. During a filtering operation, liquid effluent is passed through the filter material in a direction from the inlet surface to the outlet surface.

The present invention is particularly directed to improvements in an apparatus and a method for cleaning the filter material of filtered solids and preventing biogrowth on the filter material. The filter cleaning method may be performed while the filter material remains inside the tank and during the course of normal filter operation. A unique feature of the invention is that a backwash pump is not utilized to draw or pump a backwash stream directly from the filter tank and through the filter material. Accordingly, the disadvantages associated with using a backwash pump in such an operation is eliminated.

In one aspect of the invention, the filter cleaning apparatus includes a suction generating assembly having a suction generating nozzle, such as an eductor nozzle. The suction generating nozzle has a nozzle inlet, a nozzle outlet, and a suction port in fluid communication with the filter material. When operating fluid is passed through the suction generating nozzle in a direction from the nozzle inlet to the nozzle outlet, liquid in the filter tank is drawn through the filter material and into the suction port. The liquid stream that results acts to remove filtered solids and biogrowth from the filter material. Preferably, the suction generating assembly includes a suction member or suction head that is positioned adjacent the inlet surface of the filter material, such that filtered liquid is drawn through the filter material in a backwash or reverse direction. The backwash stream, filtered solids and biogrowth, are then discharged with the operating fluid through the nozzle outlet.

The suction generating assembly may also include a pump for passing operating fluid through the nozzle. The pump is positioned upstream of the suction generating nozzle and delivers operating fluid to the nozzle inlet. A suction inlet of the pump may be positioned in fluid communication with the filter tank so as to draw operating fluid from the tank, or from an alternative liquid source.

In alternative embodiments, the suction generating assembly may include a plurality of suction generating nozzles and/or a plurality of pumps for passing operating fluid through the suction generating nozzles. Further, such a suction generating assembly may be utilized to clean a plurality of filter materials at once.

A preferred method of cleaning the filter material of a filter apparatus includes the steps of: providing a suction generating nozzle having a nozzle inlet, a nozzle outlet, and a suction port; providing a suction member in fluid communication with the suction port; positioning the suction member adjacent the influent surface of the filter material; and operating the pump to deliver operating fluid to the nozzle inlet and to pass the operating fluid through the suction generating nozzle in a direction from the nozzle inlet to the nozzle outlet. The above steps results in liquid being drawn through the filter material in a backwash direction and into the suction port, thereby removing filtered solids from the filter material. The liquid and filtered solids are then discharged through the nozzle outlet.

In another aspect of the invention, the cleaning method incorporates a method of removing influent solids from the filter tank by operating the pump so as to draw operating fluid from a bottom portion of the filter tank. Influent solids that accumulate in the bottom portion are removed therefrom with the operating fluid.

A significant advantage of the present invention over prior art methods and devices for cleaning filter material supported within similarly constructed filter devices is that the method and apparatus of the invention maintains the filter material in a substantially clean, and thus, effective filtering condition for longer periods of filter operation. This advantage results because the suction generating assembly of the present invention retards the rate at which filtered solids accumulate within the filter material, compared to prior art filter cleaning devices. Consequently, because the filtered solids do not accumulate within the filter media as rapidly, it is not necessary to interrupt the filter operation as frequently to clean the filter material.

The suction generating nozzles are also simpler in construction than prior art backwash pumps and are not operated under as harsh an operating environment. As a result, the suction generating nozzles are more cost effective, do not require nearly as much maintenance as prior art backwash pumps, and are not as easily damaged. Thus, the suction generating assembly of the present invention is more reliable and durable than prior art filter cleaning devices.

It is also a feature and an advantage of the present invention to provide a method of cleaning filter material that is more effective than prior art filter cleaning methods.

It is also a feature and an advantage of the present invention to provide a filter cleaning apparatus that is simple to operate and not labor intensive.

It is a feature and an advantage of the present invention to provide a method of cleaning filter material that does not subject the filter material to harsh operating conditions, thereby extending the operating life of the filter material.

BRIEF DESCRIPTION OF THE DRAWINGS

FIG. 2A is a cross sectional view of a suction generating nozzle.

DETAILED DESCRIPTION OF THE PREFERRED EMBODIMENT

Figure 1:
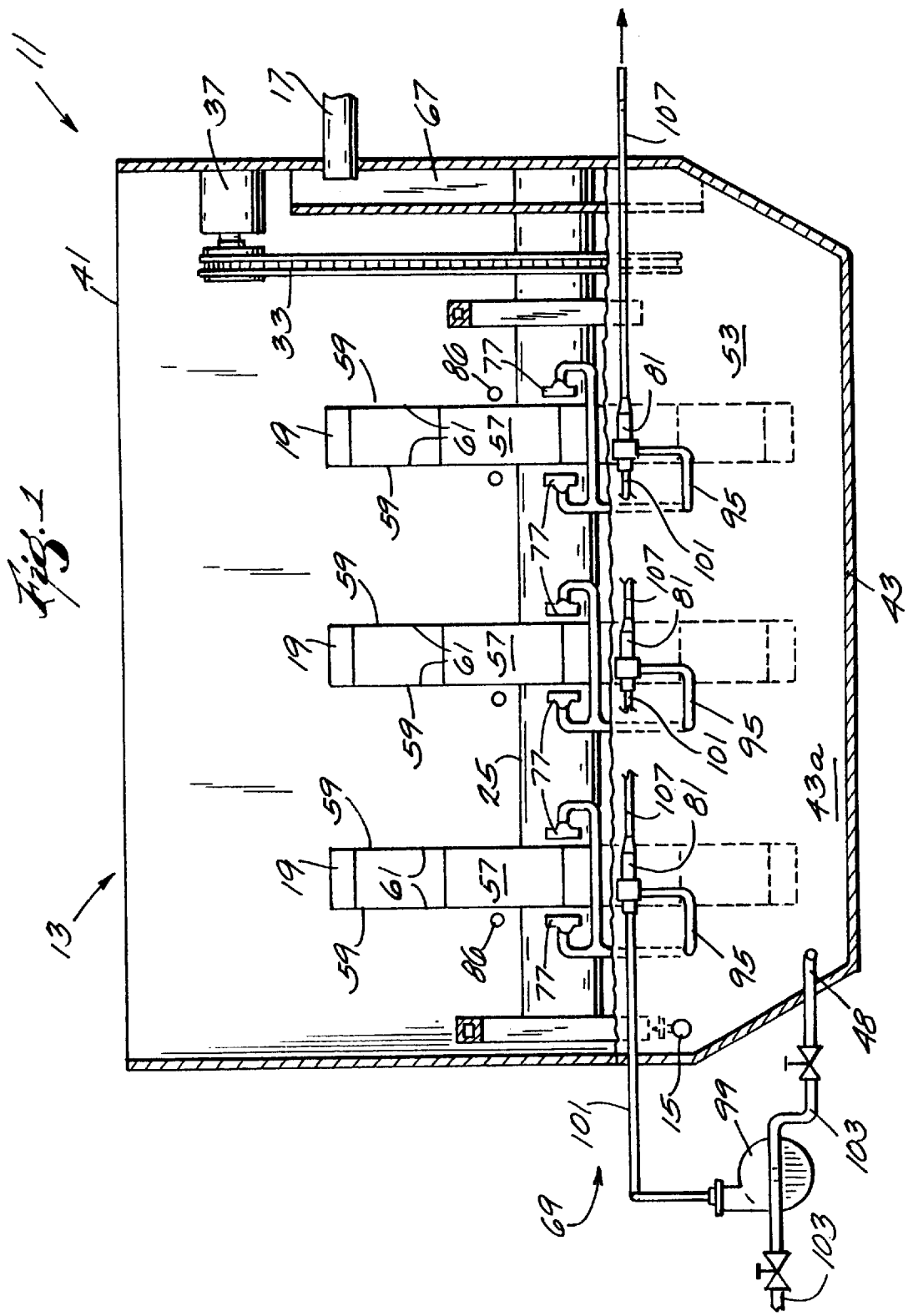
FIG. 1 is a diagrammatic front sectional view through the filter apparatus.
Figure 2:
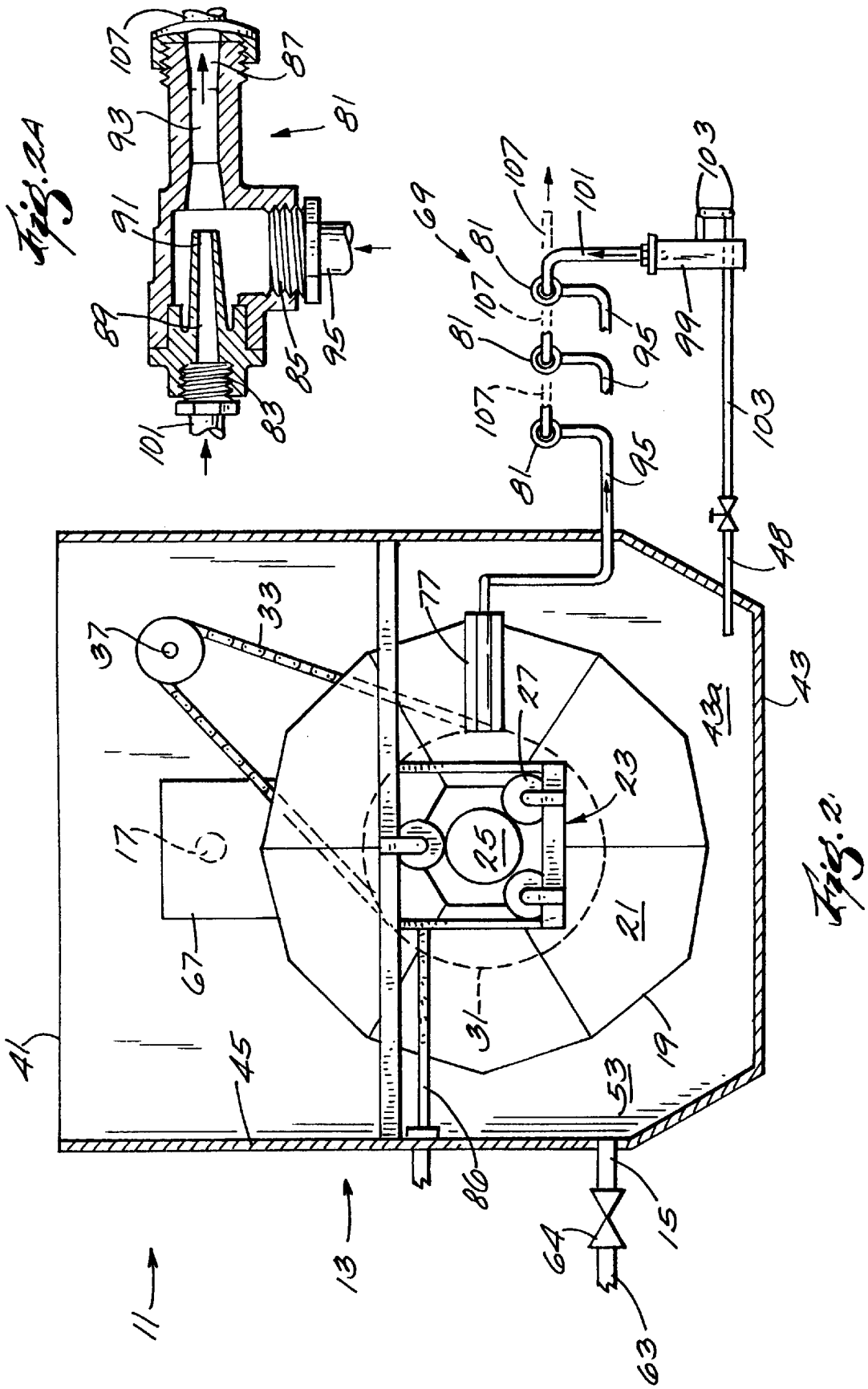
FIG. 2 is a diagrammatic partial side sectional view through the filter apparatus.

FIGS. 1 and 2 depict a filter apparatus 11 embodying the present invention. The filter apparatus 11 is particularly applicable in a wastewater treatment facility. The filter apparatus 11 includes a filter tank 13 having an influent inlet 15 and an effluent outlet 17, three filter frames 19 disposed between the influent inlet 15 and the effluent outlet 17, and filter material 21 supported by each filter frame 19. In alternative embodiments, the filter apparatus 11 may include additional filter frames or a single filter frame.

Referring now to FIG. 2, filter frames 19 are covered by filter material 21, and are generally vertically disposed and spaced apart in parallel relation. Each filter frame 19 is supported by, and fixed to, a horizontally disposed hollow drum 25 that is supported for rotation about its central longitudinal axis by a mounting assembly 23. The mounting assembly 23 includes at least three rollers 27 which engage an outer surface of the hollow drum 25. The rollers 27 allow the hollow drum 25 and the filter frames 19 to be rotated about the longitudinal axis of the drum 25. A sprocket 31 encircles the hollow drum 25, and a chain drive 33 drivingly engages the sprocket 31. The chain drive 33 is adapted to be driven by a motor 37 for rotating the hollow drum 25 and filter frames 19. During normal filter operation, however, the filter frames 19 remain stationary and are not rotated.

The filter tank 13 has an open top 41, a bottom 43, and side walls 45. Near the tank bottom 43, the filter tank 13 is tapered so as to form a bottom portion or hopper 43a. A bottom outlet 48 is provided in the hopper 43a for removing solids from the tank bottom 43.

Referring now to FIG. 2, an influent chamber 53 is defined by the liquid retaining space inside the filter tank 13 that is outside of the filter frames 19. Further, a pair of effluent chambers 57 are defined by the spaces enclosed by the filter material 21. Each filter frame 19 has a pair of parallel spaced part inlet surfaces or influent surfaces 59 which face the influent chamber 53. The filter material 21 also has a pair of parallel spaced apart outlet surfaces or effluent surfaces 61, located inside of the filter frames 19, that face the effluent chamber 57.

During filter operation, liquid influent containing suspended solids is supplied by gravity feed or from a pump (not shown) to an influent supply line 63 controlled by a valve 64 (FIG. 1). Through the influent supply line 63, liquid influent enters the influent chamber 53 and is passed through the filter material 21 of the filter frames 19. As the liquid passes through the filter material 21, the suspended solids are filtered out by the filter material 21. The filtered liquid flows through the filter material 21, and into the effluent chamber 57 which is fluidly connected by seals to hollow drum 25, a rising effluent conduit 67, and the effluent outlet 17. The effluent outlet 17 is typically positioned at a level adjacent the uppermost portions of the filter frames 19.

Some heavier solids may separate from the liquid influent, and settle in the hopper 43a. These solids may be removed from the hopper 43a via the bottom outlet 48. In a typical wastewater treatment facility, such solids are pumped out of the hopper 43a through the bottom outlet 48 on an intermittent basis. The solids may be discharged back to the headworks, digester, or other solids collection area of the facility.

After successive or continuous filter operations, solids accumulation on and within the filter material 21 begins to negatively affect the performance of the filtering operation. Accordingly, the filter apparatus 11 is provided a system for cleaning the filter material of filtered solids and biogrowth, without removing filter material 21 from the filter tank 13 and without interrupting the filter operation. The filter cleaning system includes a suction generating assembly 69 for backwashing the filter material 21 in a first filter cleaning operation.

Figure 3:
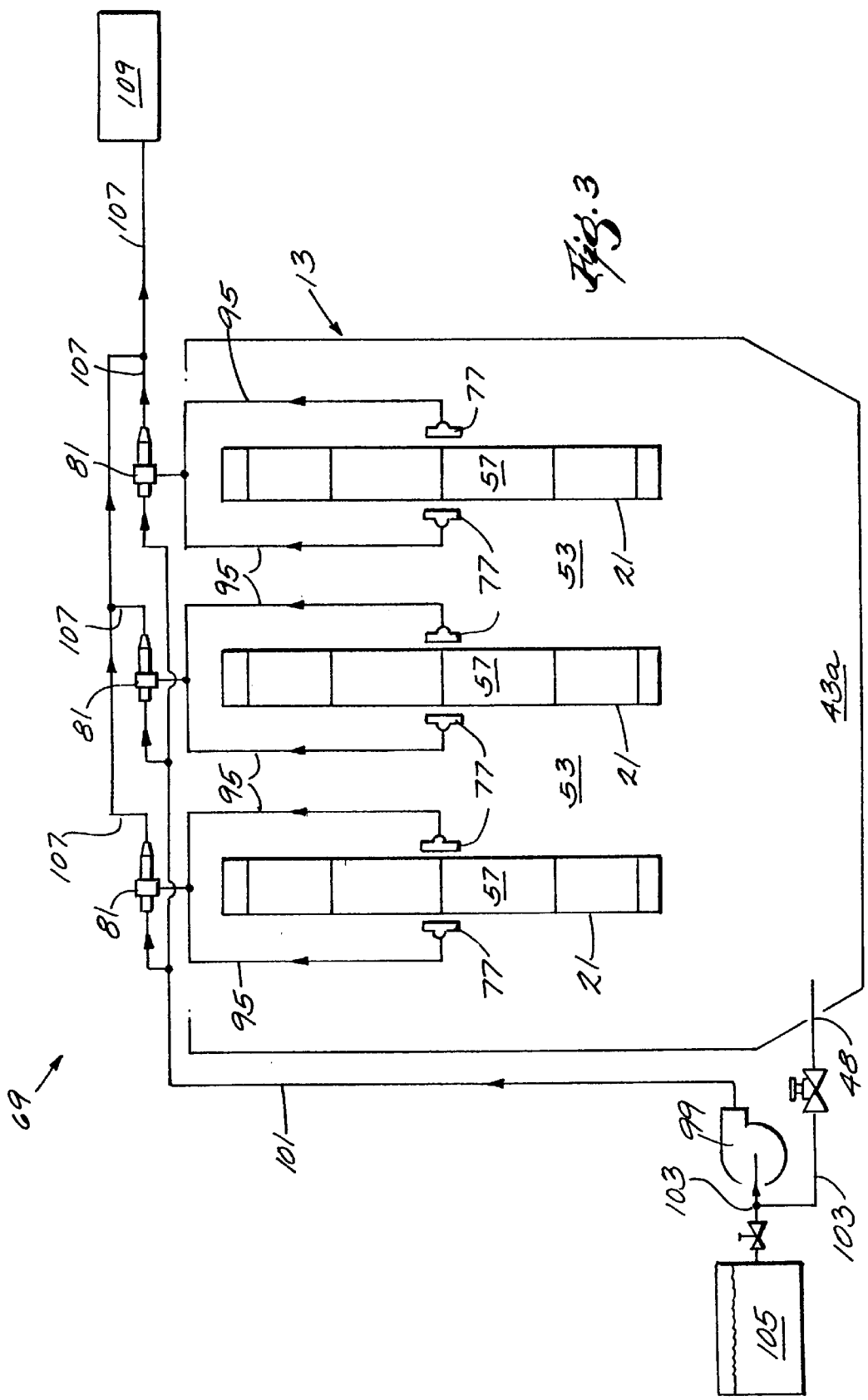
FIG. 3 is a schematic diagram of a system for cleaning the filter materials of the filter apparatus.

Referring to FIGS. 1–3, the suction generating assembly 69 utilizes three suction generating nozzles 81 to draw a backwash flow through each filter material 21. Each suction generating nozzle 81 is dedicated to a single filter frame 19 supporting filter material 21. The suction generating nozzles 81 may be disposed inside the filter tank 13 and close to the filter frame 19, or, as depicted in FIGS. 1 and 2, may be disposed adjacent the outside of the filter tank 13. The suction generating nozzles 81 are preferably commercially available eductor nozzles, such as liquid jet nozzles manufactured by Penberthy, Inc. of Prophetstown, Ill.

Referring to FIG. 2a, each nozzle 81 has an inlet 83 for receiving operating fluid at a relatively high pressure from an operable fluid source, a suction port 85 for receiving a backwash flow from the filter material 21, and an outlet 87 for discharging both operating fluid and backwash flow. Further, the suction generating nozzle 81 includes a flow convergent zone 89 extending downstream from the inlet 83, a throat area 91 located at the downstream end of the flow convergent zone 89, and a divergent zone 93 extending from the throat area 91 to the nozzle outlet 87. The suction port 85 communicates directly with the throat area 91. When operating fluid is passed through the suction generating nozzle 81 in a direction from the nozzle inlet 83 to the nozzle outlet 87, suction is generated at suction port 85, as is described below.

Referring to FIGS. 1 and 2, backwash suction piping 95 extends between each suction port 85 and a pair of suction heads 77 positioned inside the filter tank 13. The suction heads 77 are preferably positioned adjacent each influent surface 59 of the filter material 21. Typically, the filter material 21 is a material such as cloth which flexibly conforms to the suction head 77 when the suction generating nozzle 81 is operated.

The suction generating assembly 69 further includes a single motive pump 99 positioned upstream of the inlet 83 of each suction generating nozzle 81 and mounted adjacent the outside of the filter tank 13. Pump discharge piping 101 connects the discharge side of the motive pump 99 with the inlet 83 of each nozzle 81. The suction side of the pump 99 is connected by pump suction piping 103 to a liquid source 105 such as a plant water line (see also FIG. 3). The suction side of the motive pump 99 is also connected by pump suction piping 103 to the hopper 43*a* of the filter tank 13, as depicted in FIGS. 1–3. The motive pump 99 is, therefore, positioned in fluid communication with an influent chamber 53 of the filter tank 13.

The outlets 87 of the three suction generating nozzles 81 connect to a common discharge line 107 (see FIGS. 2 and 3). The discharge line 107 extends from the filter tank 13 to a designated discharge area 109. In a typical treatment facility, the common discharge line 107 may terminate at a digester tank, settling basin, or dedicated waste storage.

In alternative embodiments, the suction generating assembly 69 may include a plurality of motive pumps 99. For example, each filter frame 19 supporting filter material 21 may be serviceable by a dedicated motive pump 99. In a further embodiment, a suction generating nozzle 81 may be dedicated to each influent surface 59 of filter material 21, i.e, two suction generating nozzles 81 for each filter material 21. In any case, the motive pump(s) 99 and suction generating nozzles 81 may be operated to clean multiple filter materials 21 at once, if desired.

Now referring to the schematic of the suction generating assembly of FIG. 3, the motive pump 99 may be operated to draw operating fluid from the liquid source 105. Through the pump discharge piping 101, the pump 99 delivers operating fluid at a relatively high pressure to the inlets 83 of the three suction generating nozzles 81. The operating fluid enters the nozzle inlet 83 and passes through the convergent zone 89 of the nozzle 81 (see FIG. 2*a*). In accordance with basic principles of fluid motion, the velocity of the operating fluid increases as it travels through the convergent zone 89 while the fluid pressure along the convergent zone 89 decreases (see FIG. 2*a*). At the throat area 91 and near the suction port 85, the fluid pressure is at a minimum.

The pressure differential between each suction port 85 and the effluent chamber 57 of the tank 13 draws filtered liquid from the effluent chamber 57 into both suction heads 77. The backwash flow that results flows through the filter material 21 in a direction reverse of the normal filtering direction, thereby removing filtered solids from on and within the filter material 21. The filtered solids are carried with the backwash flow through each suction head 77, through the backwash suction piping 95, and through the suction port 85 of the nozzle 81. The backwash flow and the filtered solids are then discharged along with the operating fluid through the nozzle outlet 87 and through the common discharge line 107.

The motive pump 99 may also be operated so as to draw suction from the hopper 43*a* of the filter tank 13 and to utilize liquid in the influent chamber 53 as the operating fluid. The operating fluid will, therefore, contain solids that have settled into the hopper 43*a*. Typically, these solids are pumped out of the hopper 43*a* on an intermittent basis in an operation referred to as the sludge disposal cycle. By drawing operating fluid from the hopper 43*a*, the method according to the invention integrates the sludge disposal cycle with the backwash operation.

Preferably, the filter frame 19 is rotated slowly during the backwash operation by energizing motor 37 and driving sprocket 31 through drive chain 33. In this manner, substantially all of the influent surfaces 59 of the filter material 21 are brought into contact with the suction heads 77.

The filter cleaning system also includes a high pressure spray means that is operable to direct a high velocity liquid stream to the surfaces of the filter material 21. The high pressure spray means includes a high-pressure pump (not shown) that is connected to a set of spray nozzles or spray heads 86. Each spray head 86 is positioned nearly adjacent an influent surface 59 of the filter material. When operated, the high-pressure pump delivers a liquid stream at high pressure to each of the spray heads 86, and each spray head 86 directs a high velocity liquid stream against a portion of the surface 59. The liquid stream acts to wash the influent surface 59 and to remove solids that have accumulated thereon. The liquid stream also penetrates the influent surface 59 to impact and dislodge filtered solids entrained within the filter material 21. In an alternative arrangement, the spray heads 86 are positioned inside the effluent chambers 57 to direct liquid streams in opposite directions against portions of the effluent surfaces 61.

In an alternative embodiment, each suction head 77 is positioned adjacent the influent surface 59 of the filter material 21 and immediately below a spray head 86. In yet another embodiment, the spray head 86 is positioned adjacent the effluent surface 61 of the filter material 21 while the suction head 77 is positioned adjacent the influent surface 59 and at substantially the same elevation as the spray head 86. In either alternative embodiment, the suction generating assembly 69 may be operated simultaneously with operation of the spray heads 86 such that the suction heads 77 remove solids dislodged from the filter material 21 by the spray heads 86 and most of the liquid stream directed by the spray heads 86 on to the filter material 21.

Operation of the spray heads 86 often results in air being forced into the filter material 21 by the high velocity liquid stream. In the prior art, wherein a centrifugal pump is employed as a backwash pump, this air may be captured by the suction heads 77 and introduced into the pump and suction piping, thereby disrupting the backwash operation. The suction generating assembly 69 embodying the invention is particularly adapted to being simultaneously operated with the spray heads 86 because the suction generating nozzles 81 can easily pass air through the suction generating assembly 69 without disrupting the backwash operation. This feature and attribute of the present invention will be explained in greater detail below.

Prior to operation of the spray heads 86, the liquid level in the influent chamber 53 is preferably lowered to a height below the spray heads 86 but above the suction heads 77 (see FIG. 3). Typically, the filter operation is stopped and sufficient liquid volume is drained from the filter tank to expose the spray heads 86. By exposing the spray heads 86, the high pressure spray means is operated more efficiently and more effectively.

The suction generating assembly 69 may be advantageously incorporated into an apparatus for cleaning a filter apparatus as disclosed in U.S. Pat. No. 5,374,360 (assigned to the assignee of the present invention), hereby incorporated by reference. This patent also discloses an alternative method of lowering the liquid level below the spray heads 86. The cleaning apparatus includes an air-tight hood mounted inside the filter tank 13 and extending over an upper portion of each filter frame 19 including the spray heads 86. The hood is vented to atmosphere during a filter operation to allow influent to flow into the hood and immerse the filter frame 19. Prior to operation of the spray heads 86, air pressure is supplied to the hood so as to pneumatically depress the liquid in the hood to a level below the spray heads 86. In this way, filter downtime is reduced substantially because the filter tank 13 does not have to be drained prior to commencing operation of the spray heads 86.

The suction generating assembly 69 embodying the invention is particularly adapted to such a cleaning apparatus and method of cleaning filter material primarily because the suction generating assembly 69 may be operated simultaneously with the spray heads 86. If pressurized air is forced into and trapped in the filter material 21, the suction generating nozzles 81 can conveniently pass the air without an interruption in the filter cleaning process. Alternatively, a smaller, modified hood (i.e., a cylinder) may be installed around each spray head 86, and operated to displace only liquid around the spray head 86. During a cleaning operation, both the spray heads 86 and the suction heads 77 may be operated at the same time and any pressurized air forced into the filter material 21 can be captured by an adjacent suction head 77 without interrupting the operation.

Additional features and advantages unique to the filter cleaning apparatus and method of the present invention will now be discussed.

As solids accumulate on the filter material 21 during successive or continuous filter operations, the friction losses across the filter material 21 increases. In prior art filtering devices, wherein a centrifugal pump is used as a backwash pump, the rise in friction losses decreases the net positive suction head available to the backwash pump and increases the total head for the backwash pump. Accordingly, the backwash flow rate generated by the backwash pump decreases, which, in turn, reduces the capacity of the backwash flow to dislodge deeply embedded solids from the filter material. Thus, the effectiveness of the backwash operation diminishes with time and as more solids accumulate within the filter material.

In the present invention, the filter cleaning performance of the suction generating nozzles 81 is less sensitive to an increase in the friction losses across the filter material 21 than a centrifugal pump. This results because the total head of the motive pump 99, which determines the flow rate of the operating fluid passed through the suction generating nozzles 81, is not directly affected by the suction head between the suction port 85 of the nozzle 81 and the effluent chamber 57. More specifically, the low suction pressure created at the throat area 91 by passing operating fluid through the suction generating nozzle 81 is largely unaffected by the degree at which solids accumulate on the filter material 21. Thus, the flow rate of the backwash flow generated by the suction generating nozzle 81, as well as the momentum of the backwash flow, is maintained at higher levels for longer durations. As a further result, the rate at which solids accumulate within the filter material 21 increases less rapidly.

Another advantage of the suction generating assembly 69 according to the present invention is that the suction generating assembly 69 can generally tolerate the suction heads 77 being exposed above the liquid level. Typically, the suction generating nozzles 81 are operated when the liquid level of the filter tank 13 is above the suction heads 77. In prior art filtering devices wherein a centrifugal pump is employed to backwash the filter material, operating the centrifugal pump when the suction heads are above the liquid level results in the pump losing suction and the backwash operation being interrupted. In the present suction generating assembly 69, air drawn into the suction heads 77 is merely passed through the backwash suction piping 95 and discharged through the nozzles 81. Although a steady backwash flow may not be generated, the suction generating nozzle 81 functions even when the suction heads 77 are exposed above the liquid level. As a result, the backwash operation and the filter operation are not interrupted.

When a centrifugal pump is employed as a backwash pump, a substantial reduction in net positive suction head may also cause the backwash pump to cavitate before losing suction. Prolonged cavitation is particularly damaging to the surfaces of the impeller, and leads to pump imbalance, loss of pump efficiency, and a reduction in the life of the impeller, bearings, and seals. Further, a cavitating pump typically necessitates the attention of an operator and an interruption in the filter operation. The components of the present suction generating assembly 69 are not as mechanically vulnerable as the components of the backwash pump. Foremost, the suction generating nozzles 81 do not employ rotating components. The suction generating nozzles 81 does not include components such as bearings, seals, or impellers, which are particularly susceptible to damage from cavitation.

There are additional advantages realized through utilization of the filter cleaning apparatus and method of the present invention in lieu of prior art filter cleaning devices wherein a centrifugal pump is employed as a backwash pump. Some of the advantages are discussed below.

a. If air becomes entrained in the suction piping of the prior art filtering device, the centrifugal pump has to be primed by an operator or by a control module prior to the filter cleaning operation. Otherwise, the backwash pump may not draw suction and could run dry, thereby damaging pump seals, the filter material, and other equipment. In the filter cleaning method of the present invention, the suction generating assembly does not have to be primed prior to operation. Air entrained in the backwash suction piping 95 is purged out automatically upon operation of the suction generating nozzles 81.

b. The backwash operation according to the filter cleaning method of the invention is more consistent and more predictable because the performance of the suction generating nozzles 81 is not as dependent on the conditions of the filter material 21 and backwash suction piping 95. Therefore, the filter cleaning method of the invention is easier to employ.

c. In the filter cleaning method of the invention, the filter material 21, i.e. cloth filter media, is not subjected to pressure variations and surges that are commonly caused by improperly operated backwash pumps. Accordingly, the life of the filter material 21 is extended, relative to filter material employed in prior art filter cleaning devices.

d. The filter cleaning apparatus and method of the invention maintains the filter material 21 in a clean condition for longer periods. Accordingly, filter efficiency and effluent quality are also maintained at higher levels for longer periods.

e. Because solids do not accumulate within the filter material 21 as rapidly, the time interval between filter wash operations is longer and filter downtime is reduced.

While one embodiment of the present invention has been shown and described, alternate embodiments will be apparent to those skilled in the art and are within the intended scope of the present invention. Therefore, the scope of the present invention is to be limited only by the following claims:

What is claimed is:

1. A disk filter apparatus for filtering suspended solids from liquid influent, the disk filter apparatus comprising:

a tank having an inlet for receiving liquid influent and an outlet for filtered effluent;

a disk-shared frame disposed inside said tank and supporting filter material, said filter material having an inlet surface and an outlet surface, wherein liquefied influent can be passed through said filter material in a direction from said inlet surface to said outlet surface; and a suction generating assembly including a suction generating nozzle having a nozzle inlet, a nozzle outlet, and a suction port in fluid communication with said filter material, the suction port drawing liquid in said tank through said filter material to remove filtered solids from said filter material when operating fluid is passed through said suction generating nozzle in a direction from said nozzle inlet to said nozzle outlet.

2. The filter apparatus of claim 1, wherein said suction generating nozzle is an eductor nozzle.

3. The filter apparatus of claim 1, further comprising:

a pump positioned upstream of said nozzle inlet and operable to pump operating fluid under pressure through said nozzle in a direction from said nozzle inlet to said nozzle outlet.

4. The filter apparatus of claim 3, further comprising:

a second frame disposed inside said tank and supporting a second filter material, said second filter material having a second inlet surface and a second outlet surface; and wherein said suction generating assembly includes a second suction generating nozzle having a second nozzle inlet, a second nozzle outlet, and a second suction port in fluid communication with said second inlet surface, wherein said pump is positioned upstream of said second inlet and operable to pump operating fluid through at least one of said first and second suction generating nozzles.

5. The filter apparatus of claim 3, wherein said pump has a pump inlet in fluid communication with said filter tank and operable to draw operating fluid from said filter tank.

6. The filter apparatus of claim 3, wherein said filter tank includes a bottom portion wherein influent solids can accumulate, and wherein said pump inlet is positioned in fluid communication with said bottom portion and operable to draw operating fluid from said bottom portion to remove influent solids from said bottom portion with said operating fluid.

7. The filter apparatus of claim 1, wherein said suction generating assembly includes a suction member positioned adjacent said filter material and in fluid communication with said suction port of said suction generating nozzle, said suction member drawing liquid in said tank when operating fluid is passed through said suction generating nozzle in a direction from said nozzle inlet to said nozzle outlet.

8. The filter apparatus of claim 7, wherein said suction member is positioned adjacent said inlet surface of said filter material and drawing filtered liquid through said filter material in a reverse direction when operating fluid is passed through said suction generating nozzle in a direction from said nozzle inlet to said nozzle outlet.

9. A method of cleaning filter material in a disk filter, the disk filter including a tank having an inlet for receiving liquid influent and an outlet for filtered effluent, the filter material being supported on a disk-shaped frame inside the tank between the inlet and the outlet and for filtering out suspended solids from liquid passed through the filter material as the liquid flows from the inlet to the outlet, the filter material having an inlet surface and an outlet surface, the cleaning method comprising the steps of:

providing a suction generating nozzle having a nozzle inlet, a nozzle outlet, and a suction port;

positioning the suction port of the suction generating nozzle in fluid communication with the filter material;

passing operating fluid through the suction generating nozzle in a direction from the nozzle inlet to the nozzle outlet so as to draw liquid in the tank through the filter material and into the suction port to remove filtered solids from the filter material; and discharging the liquid and the filtered solids through the nozzle outlet with the operating fluid.

10. The cleaning method of claim 9, further comprising the steps of:

providing a suction member in fluid communication with the suction port of the suction generating nozzle; and positioning the suction member adjacent the filter material, such that the liquid is drawn through the filter material and into the suction member during the step of passing operating fluid through the suction generating nozzle.

11. The cleaning method of claim 10, wherein the step of positioning the suction member includes positioning the suction member adjacent the inlet surface of the filter material such that the liquid is drawn through the filter material in a reverse direction during the step of passing operating fluid through the suction generating nozzle.

12. The cleaning method of claim 9, further comprising the steps of:

providing a pump;

positioning the pump upstream of the inlet of the suction generating nozzle; and wherein said step of passing operating fluid through the suction generating nozzle includes operating the pump so as to deliver operating fluid to the inlet of the suction generating nozzle.

13. The cleaning method of claim 12, further comprising the step of positioning the pump in fluid communication with the filter tank, such that operating fluid is drawn from the filter tank during the step of operating the pump.

14. The cleaning method of claim 12, wherein the filter apparatus includes a second filter material supported inside the tank between the inlet and the outlet, the cleaning method further comprising the steps of:

providing a second suction generating nozzle having a second nozzle inlet, a second nozzle outlet, and a second suction port;

positioning the second suction generating nozzle downstream of the pump;

positioning the suction port of the second suction generating nozzle in fluid communication with the second filter material; and wherein said step of operating the pump includes delivering operating fluid to the second nozzle inlet of the second suction generating nozzle, such that operating fluid is passed through the second suction generating nozzle in a direction from the second nozzle inlet to the second nozzle outlet to draw liquid in the tank through the second filter material and into the second suction port and to remove filtered solids from the second filter material.

15. A cleaning apparatus in a disk filter for removing filtered solids from filter material, wherein the disk filter includes a tank having an inlet for receiving liquid influent and an outlet for filtered effluent, the filter material being supported on a disk-shaped frame inside the tank between the inlet and the outlet and for filtering out suspended solids from liquid passed through the filter material as the liquid flows from the inlet to the outlet, the filter material having an inlet surface and an outlet surface, the cleaning apparatus comprising:

a suction generating nozzle having a nozzle inlet, a nozzle outlet, and a suction port; and a suction member in fluid communication with said suction port and positionable adjacent the filter material, said suction member drawing liquid through the filter material to remove filtered solids from the filter material when operating fluid is passed through said suction generating nozzle in a direction from said nozzle inlet to said nozzle outlet.

16. The cleaning apparatus of claim 15, wherein said suction generating nozzle is an eductor nozzle.

17. The cleaning apparatus of claim 15, further comprising:

a pump positionable upstream of said nozzle inlet and operable to pump operating fluid under pressure through said suction generating nozzle in a direction from said nozzle inlet to said nozzle outlet.

18. The cleaning apparatus of claim 17, wherein the filter apparatus includes a second frame supporting a second filter material, the second filter material including a second inlet surface and a second outlet surface, said cleaning apparatus further comprising:

a second suction generating nozzle having a second nozzle inlet, a second nozzle outlet, and a second suction port; and a second suction member in fluid communication with said second suction port and positionable adjacent the second filter material, said second suction member drawing liquid through the second filter material to remove filtered solids from the second filter material when operating fluid is passed through said second suction generating nozzle in a direction from said second nozzle inlet to said second nozzle outlet; and wherein said pump is positionable upstream of said second nozzle inlet and operable to pump operating fluid under pressure through at least one of said first and second suction generating nozzles.

19. The cleaning apparatus of claim 17, wherein said pump has a pump inlet that is positionable in fluid communication with the filter tank to draw operating fluid from the filter tank.

20. The cleaning apparatus of claim 17, wherein the filter tank includes a bottom portion wherein influent solids can accumulate, and wherein said pump inlet is positionable in fluid communication the bottom portion and operable to draw operating fluid from the bottom portion to remove influent solids from the bottom portion with the operating fluid.

21. The cleaning apparatus of claim 15, wherein said suction member is positionable adjacent the inlet surface of the filter material and drawing filtered liquid through the filter material in a reverse direction when operating fluid is passed through said suction generating nozzle in a direction from said nozzle inlet to said nozzle outlet.

* * * * *

UNITED STATES PATENT AND TRADEMARK OFFICE
CERTIFICATE OF CORRECTION

PATENT NO. : 5,951,878
DATED : September 14, 1999
INVENTOR(S) : Gordon Astrom

It is certified that error appears in the above-identified patent and that said Letters Patent is hereby corrected as shown below:

Column 9, Line 24, delete "disk-shared" and insert --disk-shaped--.

Column 9, Line 26, delete "liquefied" and insert --liquid--.

Signed and Sealed this

Fifteenth Day of August, 2000

Attest:

Q. TODD DICKINSON

Attesting Officer     Director of Patents and Trademarks